United States Patent [19]

Nicol

[11] 4,220,908
[45] Sep. 2, 1980

[54] AUTOMOTIVE BATTERY CHARGING SYSTEM

[75] Inventor: Thomas Nicol, Lichfield, England

[73] Assignee: Lucas Industries Limited, Birmingham, England

[21] Appl. No.: 919,678

[22] Filed: Jun. 27, 1978

[30] Foreign Application Priority Data

Jul. 2, 1977 [GB] United Kingdom ............... 27808/77

[51] Int. Cl.² ............................ H02J 7/14; H02P 9/00
[52] U.S. Cl. ........................................ 322/33; 320/35; 322/28
[58] Field of Search ............... 320/35, 36, 32, 39; 322/28, 33

[56] References Cited

U.S. PATENT DOCUMENTS

| | | | |
|---|---|---|---|
| 3,496,447 | 2/1970 | Thompson | 322/28 X |
| 3,522,482 | 8/1970 | Thompson | 322/28 X |
| 3,535,616 | 10/1970 | Rutherford et al. | 322/28 |
| 3,599,079 | 8/1971 | Ansbro et al. | 320/36 X |
| 3,683,259 | 8/1972 | Allport | 322/28 X |

*Primary Examiner*—Robert J. Hickey
*Attorney, Agent, or Firm*—Holman & Stern

[57] ABSTRACT

An automotive battery charging system includes a novel temperature compensation arrangement. The conventional input potential divider has a further resistor and a temperature compensation output transistor in series across one leg of the divider. The voltage at the base of the temperature compensation output transistor is controlled by a temperature sensing circuit so as to fall linearly with rising temperature. Resistors are adjusted in manufacture to give the required level and slope for the temperature compensation characteristic.

16 Claims, 3 Drawing Figures

AUTOMOTIVE BATTERY CHARGING SYSTEM

This invention relates to an automotive battery charging system of the general kind in which the field current of a generator having its output connected to the battery is controlled by a regulator in accordance with the battery voltage.

Temperature compensation of voltage regulators has for many years presented problems to the voltage regulator manufacturers. Most users of automotive generator voltage regulators (i.e. road vehicle manufactures) specify a linearly reducing voltage set point for increasing temperature between fixed temperature limits. However different manufacturers specify different set points and slopes and it is difficult for the voltage regulator manufacturers to meet all requirements economically.

It is an object of the present invention to provide an automotive battery charging system including a voltage regulator having a temperature compensation characteristic which can readily be tailored to an individual users' requirements.

An automotive battery charging system in accordance with the invention comprises a generator having a field winding and output terminals connected to the battery and a voltage regulator controlling the field current, said voltage regulator including a battery voltage sensitive input stage coupled to an output stage which is in series with the field winding, said input stage including first and second resistors in series across the battery, the voltage at the junction of said resistors determining whether the output stage is conductive, or not, and a temperature compensation circuit for varying the voltage at said junction independently of the battery voltage and including a first transistor having its collector-emitter path in series with a third resistor across said second resistor and a temperature sensing circuit controlling the base voltage of said transistor so as to reduce such voltage substantially linearly with increasing temperature up to a predetermined upper temperature at which said output transistor ceases to conduct, the first and third resistors being adjusted to determine the height and slope of the temperature characteristics of the regulator.

With such an arrangement the temperature compensation characteristic can be readily set to any user's requirement at room temperature by imposing on the emitter of the transistor a voltage high enough to turn off the transistor and adjusting the first resistor to obtain the required regulator operating voltage at the predetermined upper temperature and then removing that voltage and adjusting the third resistor to obtain the required regulator operating voltage at the prevailing room temperature.

It is to be understood that the adjustable resistors will in actual practice be thick film resistors which are adjusted by removing part of the film to increase the resistance. Thus the regulator is made up originally with thick film resistors of ohmic value substantially smaller than any likely final desired value and these are trimmed during setting to a particular characteristic.

As a safety measure, to ensure that the generator output could not become excessively high should the generator become disconnected from the battery, there may be an auxiliary voltage sensing network consisting of a resistor chain connected across the generator output and a diode connecting a point of said chain which is normally at a lower voltage than that at the junction of the first and second resistor to such junction.

Preferably the input stage, including a reference voltage, generator, and the temperature compensation circuit are connected across the battery and draws a constant current therefrom. In this case a battery temperature sensing device may be connected in the connection between the battery and the input stage. Preferably the temperature sensing device includes a thermistor and two resistors, one in series with the thermistor and one in parallel with it.

An example of the invention is shown in the accompanying drawings in which.

Figure 1:
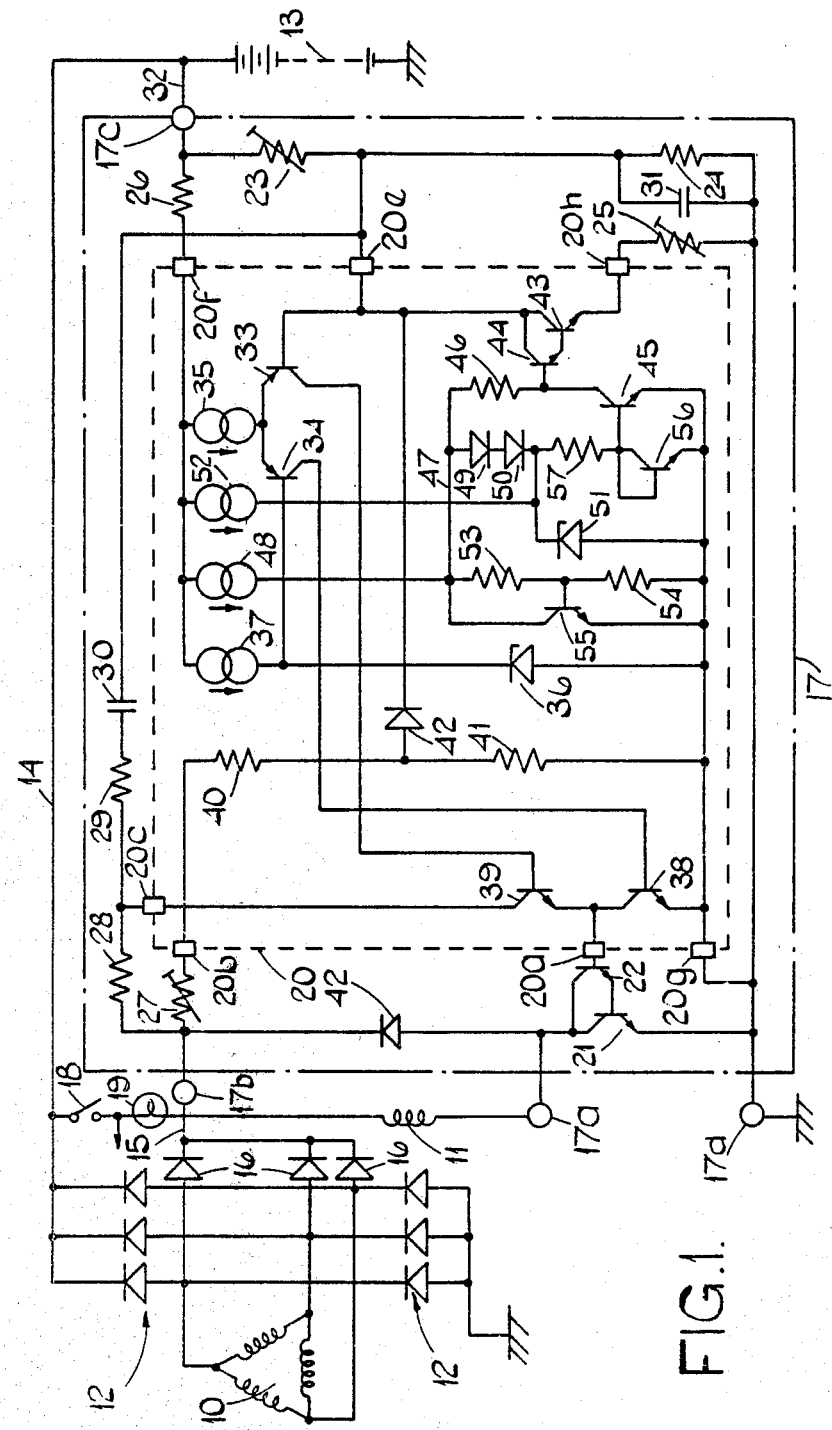
FIG. 1 is a circuit diagram of an automotive battery charging system.
Figure 3:
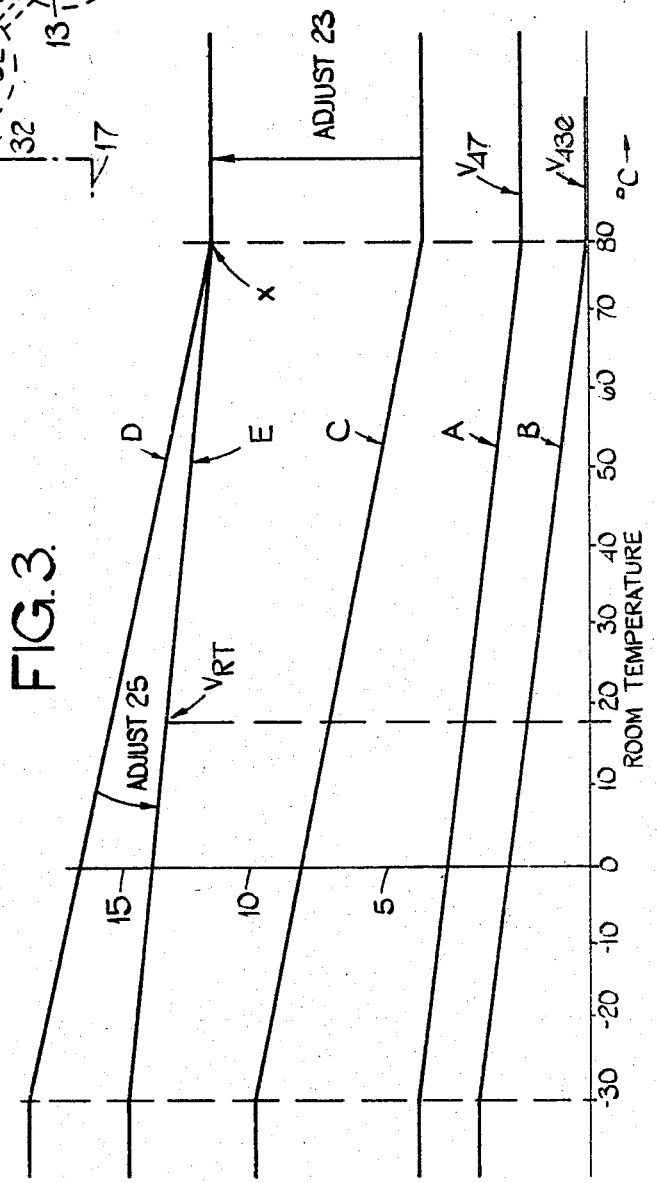

FIG. 3 graphically shows temperature voltage relationships at various points in FIG. 1.

The system shown includes a generator which comprises an alternator having a stator 10 and a field winding 11. A main rectifier 12 connects the stator output terminals to the battery 13, via a lead 14 and the chassis of the vehicle in which the system is installed hereinafter referred to as "ground". The field winding 11 is connected between a conductor 15 (connected by an auxiliary rectifier 16 to the stator output terminals) and the output terminal 17a of a voltage regulator 17. The vehicle ignition switch 18 and a warning lamp 19 are connected in series between the lead 14 and the conductor 15.

The voltage regulator 17 comprises an integrated circuit 20 and several external components including an output transistor 21 and a drive transistor 22 connected as a Darlington pair, thick film type resistors 23, 24, 25, 26 27 and 28 a feedback circuit comprising a resistor 29 and a capacitor 30 in series and a ripple suppression capacitor 31 across the resistor 24. All of these components are mounted on a ceramic substrate, the resistors being deposited directly on such substrate.

The base of the drive transistor 22 is connected to a terminal 20a of the integrated circuit. The resistors 27, 28 connect the line 15 to two terminals 20b and 20c respectively and the resistor 29 and capacitor 30 are connected in series between terminal 20e and a terminal 20c of the integrated circuit. A terminal 20f is connected to the battery via the resistor 26, a terminal 17c and a lead 32 independent of the lead 14. The resistors 23, 24 are connected in series between the lead 32 at the terminal 17c and grounded terminals 20g and 17d, the junction of these resistors being connected to the terminal 20e. Finally, the resistor 25 is connected between a terminal 20h and the terminals 20g, 17d. The integrated circuit can thus be encapsulated if required in a conventional eight-pin package.

A recirculating diode 42 is connected in parallel with the field winding 11 between the terminals 17a and 17b.

The emitter of the output transistor 21 is connected to ground and the collectors of the transistors 21, 22 are connected to the output terminal 17a so that the field winding and the collector-emitter path of the output transistor 21 are in series between the conductor 15 and ground.

The integrated circuit 20 includes an input stage comprising two pnp transistors 33, 34 with their emitters connected by a common constant current source 35 to the terminal 20f. The base of the transistor 33 is connected to the terminal 20e and the base of the transistor 34 is connected to the cathode of a zener diode 36 which is in series with another constant current source 37 between the terminals 20*f* and 20*g*. The zener diode 36 provides a reference voltage for the high gain differential pair constituted by the transistors 33, 34.

The collectors of the transistors 33, 34 are connected to the respective bases of two npn transistors 39, 38 forming a push-pull intermediate stage of the regulator. The transistor 38 has its emitter connected to the terminal 20*g* and its collector connected to the terminal 20*a*. The transistor 39 has its emitter connected to the terminal 20*a* and its collector connected to the terminal 20*c*. A pair of resistors 40, 41 are connected in series between the terminals 20*b* and 20*g*, with their common point connected to the anode of a diode 42 which has its cathode connected to the terminal 20*e*.

The voltage regulator includes a temperature compensation circuit of which the resistor 25 forms a part. The terminal 20*h* is connected to the emitter of an npn transistor 43 which, is one part of a Darlington pair also including an npn transistor 44. The collectors of these transistors are connected to the terminal 20*e*. The base of the transistor 44 is connected to the collector of an npn transistor 45 which has its emitter grounded via terminal 20*g*. The base of the transistor 44 is also connected by a resistor 46 to a rail 47 supplied with current from the terminal 20*f* via a further constant current source 48. A pair of diodes 49, 50 are connected in series between the rail 47 and the cathode of a zener diode 51 with the anode of the diode 49 connected to the rail 47 and the anode of the zener diode 51 connected to the terminal 20*g*. Yet another constant current source 52 connects the terminal 20*f* to the cathode of the zener diode 51. Two resistors 53 and 54 are connected in series between the rail 47 and the terminal 20*g* with an npn transistor 55 having its emitter connected to the terminal 20*g*, its collector connected to the rail 47 and its base connected to the junction of the resistor 53, 54.

A further npn transistor 56 has its emitter connected to the terminal 20*g* and its base and collector connected together, to the base of the transistor 45 and by a resistor 57 to the cathode of the zener diode 51.

The transistor 56 passes a constant current since the voltage at the anode of the zener diode 51 is constant (it being chosen to have a zener voltage of about 5 v so that its temperature coefficient is zero). The transistors 45, 56 are connected as a current mirror so that the current in transistor 45 is constant. The voltage on rail 47 will fall substantially linearly as the temperature rises over the required temperature range (e.g. $-30°$ C. to $+80°$ C.), being a multiple of the $V_{be}$ of the transistor 55 set by the ratio of the values of the resistors 53, 54. Since the current drawn by transistors 45 is constant the voltage at the base of transistor 44 will similarly fall linearly, the current and value of resistors 46 being chosen to make the voltage of the emitter of transistor 43 zero at 80° C. Since the emitter of the transistor 43 is connected to ground by the resistor 25 the current drawn by the transistors 43, 44 will fall linearly with falling temperature up to a predetermined upper temperature, beyond which point the voltage at the base of the transistor 44 is less than the sum of the base-emitter voltage drops of the transistors 43, 44 and transistors 43, 44 cut off. Diodes 49, 50 clamp the voltage on rail 47, to two diode drops above the voltage of zener diode 51, when the temperature is less than $-30°$ C.

The voltage at the terminal 20*e* is dependent on the voltage at terminal 17*c* and also on the current being drawn by the transistors 43, 44.

Ignoring for the time being the resistor 29 and capacitor 30, the circuit operates as follows: when the voltage at terminal 20*e* is significantly higher than that at the cathode of the zener diode 36, the transistor 34 alone of the pair 33, 34 will conduct so that transistor 38 is turned hard on and transistor 39 is turned off. Thus the output Darlington pair 21, 22 will be non-conductive and no field current will flow through transistors 21, 22. When the voltage at terminal 20*e* is significantly lower than the zener diode reference voltage, the transistor 33 will conduct instead of the transistor 34 so that transistor 39 is turned on, transistor 38 is turned off, the output Darlington pair 21, 22 will conduct heavily and field current will increase. Between these two states there is an operating region in which (in the absence of the resistor 29 and capacitor 30) the output Darlington pair would change smoothly from non-conduction to conduction. The introduction of the resistor 29 and capacitor 30 to provide positive feedback ensures that the transistor between the two limiting states occurs abruptly. In the absence of the capacitor 30 i.e., with feedback provided by a resistor 29 only, the circuit would have the transfer characteristic of a Schmitt trigger circuit with hysteresis. The capacitor 30, however, ensures that there is only transient positive feedback.

Thus in a situation where the battery voltage is significantly above the set voltage level and falling slowly, when the transistor 33 starts to conduct the transistor 39 will start to conduct so that the voltage at its collector will start to fall. At this time the capacitor 30 was charged with its left hand side (as viewed in FIG. 1) positive relative to its right hand side. As the collector voltage of transistor 39 starts to fall there will be a corresponding fall in voltage at the terminal 20*e* because of the capacitor 30. This will tend to turn the transistor 33 on more so that the voltage at the collector of the transistor 39 falls more and the circuit thus switches rapidly to its conductive condition. The voltage on the capacitor 30 is still approximately the same as it was initially and whilst the charge on the capacitor 30 is reversing (with a time constant dependent on the resistor 29), the transistors 33, 39, 22 and 21 remain hard on. When such charge reversal is complete the base current being drawn from transistor 33 starts to fall again and the process described above reverses and the output Darlington pair 21, 22 switches off again rapidly. The frequency of the oscillating condition set up will be approximately constant but the mark-to-space ratio will vary according to the battery voltage, such ratio increasing as the battery voltage falls.

The temperature compensation circuit ensures that the set voltage of the regulator rises as the temperature falls. An upper limit to the set voltage is reached at a lower temperature limit (e.g., $-30°$ C.) when the voltage on the rail 47 exceeds the voltage of zener diode 51 by two diode drops. A lower limit is reached at $+80°$ C. when the transistors 43, 44 cut off. Line A in FIG. 3 shows the voltage on line 47 and line B the voltage at the terminal 20*h*.

To set up the required temperature compensation characteristic in FIG. 3 during manufacture of the regulator, an external bias voltage is applied to the terminal 20*h* sufficient to cut-off the transistors 43, 44 and the resistors 23 is adjusted (by laser trimming or abrasion) until the required upper temperature limit set point at X on line D is achieved. This bias voltage is then removed and resistor 25 is adjusted in the same manner as resistor 23 until the set point $V_{RT}$ on line E appropriate to the ambient room temperature is achieved. Lines C, D and E show the set point voltage temperature characteristics, before adjustment after adjustment of resistor 23 and after adjustment of resistor 25 respectively.

The regulators can thus be mass produced with the resistors 23, 25 of low ohmic value and then subsequently set up, for sale to a particular user. In the event that the user does not require temperature compensation resistor 25 can be trimmed to open circuit and resistor 23 set to give the required set point.

The resistors 40, 41 and the diode 42 normally play no part in the functioning of the regulator, since the resistors 40, 41 are chosen so that the diode 42 is normally reverse biased. Should the lead 14 become detached or broken, however, the voltage on conductor 15 will rise (since the normal voltage sensing network 23, 24, 25 will remain at battery voltage) and diode 42 will start to conduct, thereby regulating the alternator output to a set voltage somewhat higher than normal. The resistor 27 is also adjustable during manufacture to set the alternator output voltage at which this overriding action occurs, thereby allowing the regulator to be used for any voltage setting in a nominal 24 v system as well as a nominal 12 v system.

During starting, when the ignition switch 18 is closed the lamp 19 is illuminated by current flowing from the rail 14 and through the field winding 11 and the transistors 21 and 22 which at this time are biased hard on. The switch 18 also supplies other electrical loads such as ignition. When the engine starts to run the voltage on rail 15 becomes the same as that on the rail 14 and the lamp 19 is extinguished.

Figure 2:
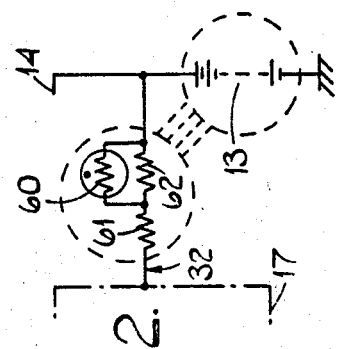
FIG. 2 shows a modification of FIG. 1.

Turning now to FIG. 2, the modification shown is the addition of a thermistor 60 with a series resistor 61 and a parallel resistor 62 connected between the battery 13 and the lead 32. This modification is useful when the battery is likely to be subjected to arduous high temperature conditions. The thermistor 60 is arranged in thermal contact with the battery (e.g. in a recess in a shelf on which the battery rests), and is a negative temperature co-efficient type, so that the set voltage falls as battery temperature rises. The input stage of the voltage regulator draws a constant current determined by current sources 35, 37, 48 and 52 (the current through resistor 23 being small by comparison) and this makes use of this very simple battery temperature sensing arrangement highly effective.

The ripple suppression capacitor 31 can be of relatively small value since the resistors 23, 24 are of higher ohmic value than those usually used in present day alternator voltage regulators as a result of the use of a high input impedance differential pair 33, 34 in the regulator input stage, and separation of the temperature compensation function from the input transistor characteristics.

I claim:

1. An automotive battery charging system comprising a generator having a field winding and output terminals connected to the battery and a voltage regulator controlling the field current, said voltage regulator including a battery voltage sensitive input stage coupled to an output stage which is in series with the field winding, said input stage including first and second resistors in series across the battery, the voltage at the junction of said resistors determining whether the output stage is conductive, or not, and a temperature compensation circuit for varying the voltage at said junction independently of the battery voltage and including a first transistor having its collector-emitter path in series with a third resistor across said second resistor and a temperature sensing circuit controlling the base voltage of said transistor so as to reduce such voltage substantially linearly with increasing temperature up to a predetermined upper temperature at which said output transistor ceases to conduct, the first and third resistors being adjusted to determine the height and slope of the temperature characteristics of the regulator.

2. A system as claimed in claim 1 in which said temperature sensing circiuit comprises a temperature sensing transistor having a resistor chain interconnecting its base, collector and emitter, so that the voltage across said resistor chain is a multiple of the base-emitter voltage of the transistor, such voltage falling substantially linearly with rising temperature, said resistor chain being connected to the base of said first transistor.

3. A system as claimed in claim 2 in which said resistor chain is connected to the base of said first transistor by a further resistor through which a constant current is caused to flow by a current mirror transistor arrangement whenever the temperature is less than said predetermined upper temperature.

4. A system as claimed in claim 3 in which said current mirror transistor arrangement comprises a second transistor connected as a diode in series with another resistor across a temperature insensitive zener diode and a third transistor having its base connected to the collector of the second transistor, its emitter connected to the emitter of the second transistor and its collector connected to the base of the first transistor.

5. A system as claimed in claim 4 in which said resistor chain is bridge by said zener diode in series with a pair of diodes to prevent the voltage across the resistor chain rising above a predetermined value at temperatures below a predetermined lower temperature.

6. A system as claimed in claim 1 in which the input stage, including a reference voltage generator, and the temperature compensation circuit are connected across the battery independently of the connection between the generator and the battery.

7. A system as claimed in claim 6 in which the input stage and the temperature compensation circuit are fed only by constant current sources, so that the current drawn thereby from the battery is constant.

8. A system as claimed in claim 7 wherein the connection of the input stage to the battery includes a battery temperature sensing device.

9. A system as claimed in claim 8 in which the battery temperature sensing device includes a thermistor in thermal contact with the battery.

10. A system as claimed in claim 9 in which said thermistor is in series with a resistor and in parallel with another resistor.

11. A system as claimed in claim 1 further comprising an auxiliary voltage sensing network comprising a further resistor chain connected across the generator output and a diode connecting a point on said further resistor chain to the junction of said first and second resistors, said diode normally being reverse biased.

12. A system as claimed in claim 1 in which the input stage comprises a differential pair of transistors one of which has its base connected to a reference voltage generator and the other of which has its base connected to the junction of said first and second resistors.

13. A system as claimed in claim 12 in which there is an intermediate stage coupling the input stage to the output stage.

14. A system as claimed in claim 13 further comprising a positive feedback circuit comprising a capacitor and resistor in series between said intermediate stage and the junction of said first and second resistors.

15. A system as claimed in claim 13 or claim 14 in which said intermediate stage comprises a pair of transistors having their bases connected to respective ones of the transistors of the input stage, and their collector-emitter paths in series, the collector of one intermediate stage transistor and the emitter of the other being connected together and to the output stage.

16. A system as claimed in claim 1 in which the output stage is a Darlington pair.

* * * * *